(12) United States Patent
Loy et al.

(10) Patent No.: US 10,647,810 B2
(45) Date of Patent: May 12, 2020

(54) METHOD OF FORMING OF A ROBUST NETWORK OF EPOXY MATERIAL THROUGH DIELS-ALDER REACTION

(71) Applicant: ARIZONA BOARD OF REGENTS ON BEHALF OF THE UNIVERSITY OF ARIZONA, Tucson, AZ (US)

(72) Inventors: Douglas A. Loy, Tucson, AZ (US); Peter McFadden, Tucson, AZ (US); Robb E. Bagge, Tucson, AZ (US)

(73) Assignee: ARIZONA BOARD OF REGENTS ON BEHALF OF THE UNIVERSITY OF ARIZONA, Tucson, AZ (US)

( * ) Notice: Subject to any disclaimer, the term of this patent is extended or adjusted under 35 U.S.C. 154(b) by 0 days.

(21) Appl. No.: 15/751,807

(22) PCT Filed: Aug. 9, 2016

(86) PCT No.: PCT/US2016/046210
§ 371 (c)(1),
(2) Date: Feb. 9, 2018

(87) PCT Pub. No.: WO2017/027525
PCT Pub. Date: Feb. 16, 2017

(65) Prior Publication Data
US 2018/0237580 A1 Aug. 23, 2018

Related U.S. Application Data

(60) Provisional application No. 62/203,812, filed on Aug. 11, 2015.

(51) Int. Cl.
*C08G 59/30* (2006.01)
*C08G 59/26* (2006.01)
(Continued)

(52) U.S. Cl.
CPC ......... *C08G 59/306* (2013.01); *C08G 59/022* (2013.01); *C08G 59/24* (2013.01);
(Continued)

(58) Field of Classification Search
None
See application file for complete search history.

(56) References Cited

U.S. PATENT DOCUMENTS

| 4,724,031 A | 2/1988 | Monnier et al. |
| 5,100,802 A | 3/1992 | Mickols |
| (Continued) | | |

FOREIGN PATENT DOCUMENTS

| JP | 2010265377 A | 11/2010 |
| WO | WO2013170313 A1 | 11/2013 |
| WO | WO2014108304 A2 | 7/2014 |

OTHER PUBLICATIONS

Hilf et al. 'Aliphatic Polycarbonates Based on Carbon Dioxide. Furfuryl Glycidyl Ether, and Glycidyl Methyl Ether: Reversible Functionalization and Cross-Linking'; Jan. 2015 Macromolecular Rapid Communications; vol. 36, Issue 2. pp. 174-179.

*Primary Examiner* — Megan McCulley
(74) *Attorney, Agent, or Firm* — Nguyen Tarbet

(57) ABSTRACT

Thermally reworkable epoxy resins prepared through a Diels-Alder reaction are described herein. A maleimide component is reacted with an electron donating component having a furan ring attached to an epoxy ether to produce the epoxy resins. The epoxy component generated by this method can be cured with different diamines lo form a robust network of epoxy material. The robust epoxy material is used as a reversible thermoset and as an adhesive. The robust epoxy network is heated at 90° C. temperature in a retro Diels-Alder fashion to produce colorless starting materials of the maleimide component and the furan component.

20 Claims, 5 Drawing Sheets

(51) Int. Cl.
  *C08G 59/50* (2006.01)
  *C09J 163/00* (2006.01)
  *C08G 59/24* (2006.01)
  *C08G 59/02* (2006.01)
(52) U.S. Cl.
  CPC ........... *C08G 59/26* (2013.01); *C08G 59/504* (2013.01); *C09J 163/00* (2013.01)

(56) References Cited

U.S. PATENT DOCUMENTS

| | | | |
|---|---|---|---|
| 5,641,856 A * | 6/1997 | Meurs | C08G 65/3324 525/428 |
| 5,760,337 A * | 6/1998 | Iyer | C08G 67/02 174/521 |
| 6,057,381 A * | 5/2000 | Ma | C08F 283/006 522/99 |
| 6,271,335 B1 * | 8/2001 | Small | C08F 283/00 264/272.11 |
| 6,337,384 B1 | 1/2002 | Loy et al. | |
| 6,403,753 B1 * | 6/2002 | Loy | C08G 18/6765 528/49 |
| 6,410,926 B1 | 6/2002 | Munro et al. | |
| 6,825,315 B2 * | 11/2004 | Aubert | C08G 73/12 521/135 |
| 2003/0116272 A1 * | 6/2003 | Aubert | C08G 73/12 156/327 |
| 2006/0025560 A1 * | 2/2006 | Inoue | C08G 63/06 528/272 |
| 2007/0149711 A1 * | 6/2007 | Chaudhary | C08F 8/00 525/244 |
| 2012/0082840 A1 * | 4/2012 | Herr | C08G 18/10 428/221 |
| 2012/0182693 A1 * | 7/2012 | Boday | H01L 23/42 361/713 |
| 2012/0261064 A1 * | 10/2012 | Boday | H01L 23/3737 156/247 |
| 2014/0262192 A1 * | 9/2014 | Boday | H01L 23/3737 165/185 |
| 2016/0237311 A1 * | 8/2016 | Mizori | C09D 179/085 |
| 2017/0008998 A1 * | 1/2017 | Sodano | C08G 18/3206 |
| 2017/0152405 A1 * | 6/2017 | Aoyama | C09J 7/00 |
| 2019/0047211 A1 * | 2/2019 | Herring | B29C 64/129 |
| 2019/0315934 A1 * | 10/2019 | Zelisko | C08J 3/246 |
| 2019/0322785 A1 * | 10/2019 | Menyo | C08F 2/60 |

* cited by examiner

| Epoxy strength testing with Epo-Tek 301 hardener. | | | | | |
|---|---|---|---|---|---|
| Test after 5 day RT cure | | | | | |
| Sample | Epoxide Mass (g) | Peak Load (N) | Peak Stress (MPa) | Modulus (MPa) | Peak Stress (PSI) |
| 1 | 0.029 | 1101.402 | 4.3 | 177.45 | 624 |
| 2 | 0.030 | 1175.427 | 4.6 | 189.573 | 667 |
| 3 | 0.030 | 1093.405 | 4.2 | 202.853 | 609 |
| 4 | 0.029 | 1232.852 | 4.8 | 231.716 | 696 |
| 5 | 0.029 | 973.499 | 3.8 | 224.475 | 551 |
| Average | 0.0294 | 1115.317 | 4.3 | 205.213 | 629 |
| Test after reclamping in ~100 C oven | | | | | |
| 1 | 0.029 | 1232.198 | 4.8 | 174.36 | 696 |
| 2 | 0.030 | 1045.557 | 4.1 | 221.400 | 595 |
| 3 | 0.030 | 924.463 | 3.6 | 203.078 | 522 |
| 4 | 0.029 | 657.298 | 2.5 | 163.274 | 363 |
| 5 | 0.029 | 710.946 | 2.8 | 241.118 | 406 |
| Average | 0.0294 | 914.0924 | 3.6 | 200.646 | 516 |
| Test after reclamping in ~110 C oven | | | | | |
| 1 | 0.029 | 1309.106 | 5.1 | 245.135 | 740 |
| 2 | 0.030 | 1767.060 | 6.8 | 270.569 | 986 |
| 3 | 0.030 | 2086.665 | 8.1 | 221.295 | 1175 |
| 4 | 0.029 | 2003.902 | 7.8 | 263.903 | 1131 |
| 5 | 0.029 | 2172.235 | 8.4 | 256.774 | 1218 |
| Average | 0.0294 | 1867.794 | 7.2 | 251.535 | 1050 |
| Test after reclamping in ~110 C oven | | | | | |
| 1 | 0.029 | 535.715 | 2.1 | 161.605 | 305 |
| 2 | 0.030 | 394.002 | 1.5 | 161.028 | 218 |
| 3 | 0.030 | 588.643 | 2.3 | 196.387 | 334 |
| 4 | 0.029 | 38.130 | 0.1 | 113.427 | 15 |
| 5 | 0.029 | 938.523 | 3.6 | 226.582 | 522 |
| Average | 0.0294 | 499.003 | 1.9 | 171.806 | 278 |

FIG. 5

METHOD OF FORMING OF A ROBUST NETWORK OF EPOXY MATERIAL THROUGH DIELS-ALDER REACTION

CROSS REFERENCE

This application claims priority to U.S. Provisional Patent Application No. 62/203,812, filed Aug. 11, 2015, the specification(s) of which is incorporated herein in their entirety by reference.

GOVERNMENT SUPPORT

This invention was made with government support under Grant No. 1241783 awarded by NSF. The government has certain rights in the invention.

FIELD OF THE INVENTION

The present invention relates to the formation of a new class of robust network of epoxy material which functions as a reversible material through a Diels-Alder reaction. The final epoxy material in this invention can be thermally cleaved to soluble small molecule fragments through a retro Diels-Alder reaction.

BACKGROUND OF THE INVENTION

Epoxies are widely used because of their strength which is a result of their crosslinked, thermoset nature. A consequence of this thermoset nature is that they are intractable and unable to be melted or dissolved. To avoid the intractability of the cross-linked epoxy, researchers are exploring the use of this maleimide/furan Diels-Alder system to be incorporated into polymer networks to generate reversible materials. But the solution is inadequate for some applications either by 1) not using epoxy functionality to generate thermoset networks or by 2) using precursors which are solid and/or that generate colored materials.

The present invention provides an alternative method to solve these problems by the use of the siloxane-linked maleimide core. The flexible and colorless tether produces a color free and liquid bis-epoxy that can be cured by any diamine to result in a colorless and thermally reversible epoxy network.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY OF THE INVENTION

In one embodiment, the present invention features a method of making a thermally reworkable epoxy material. In some embodiments, the method comprises forming a first product by reacting a maleimide component with an electron donating component. The first product was further cured with a diamine component to form the thermally reworkable robust network of the epoxy material. In some embodiments, the electron donating component may comprise a substituted furan component having an epoxide end which functions as an electron receiving group. As used herein, the terms "thermally reworkable epoxy" is defined as an epoxy material which can be cleaved to soluble starting small molecule fragments under thermal reaction conditions.

In some embodiments, the present invention features a method of making a thermally reworkable epoxy material by providing a maleimide component as a dienophile of the Diels-Alder reaction in a reaction vessel and adding an electron donating group containing furan component as a diene of the Diels-Alder reaction in the same reaction vessel. The maleimide component and the electron donating group containing furan component were heated to produce a liquid as the first product. Upon curing of the first product with a diamine hardener, the first product bonds with the diamine hardener to form the thermally reworkable epoxy material which can be thermally transformed from crosslinked network back to soluble small molecule fragments.

One of the unique and inventive technical features of the present invention is use of a siloxane-linked maleimide core that provides for an epoxy material that functions as a reversible material, which can be thermally transformed from a crosslinked network back to soluble small molecule fragments. Without wishing to limit the invention to any theory or mechanism, it is believed that the technical feature of the present invention advantageously provides for an epoxy that is reworkable, i.e. able to be melted or dissolved, and that is able to retain desirable characteristics such as colorlessness and liquid precursors in its reverted form. None of the presently known prior references or work has the unique inventive technical feature of the present invention.

BRIEF DESCRIPTION OF THE DRAWINGS

FIG. 5 shows exemplary results of epoxy strength testing with Epo-Tek 301 hardener.

DESCRIPTION OF PREFERRED EMBODIMENTS

Figure 1:
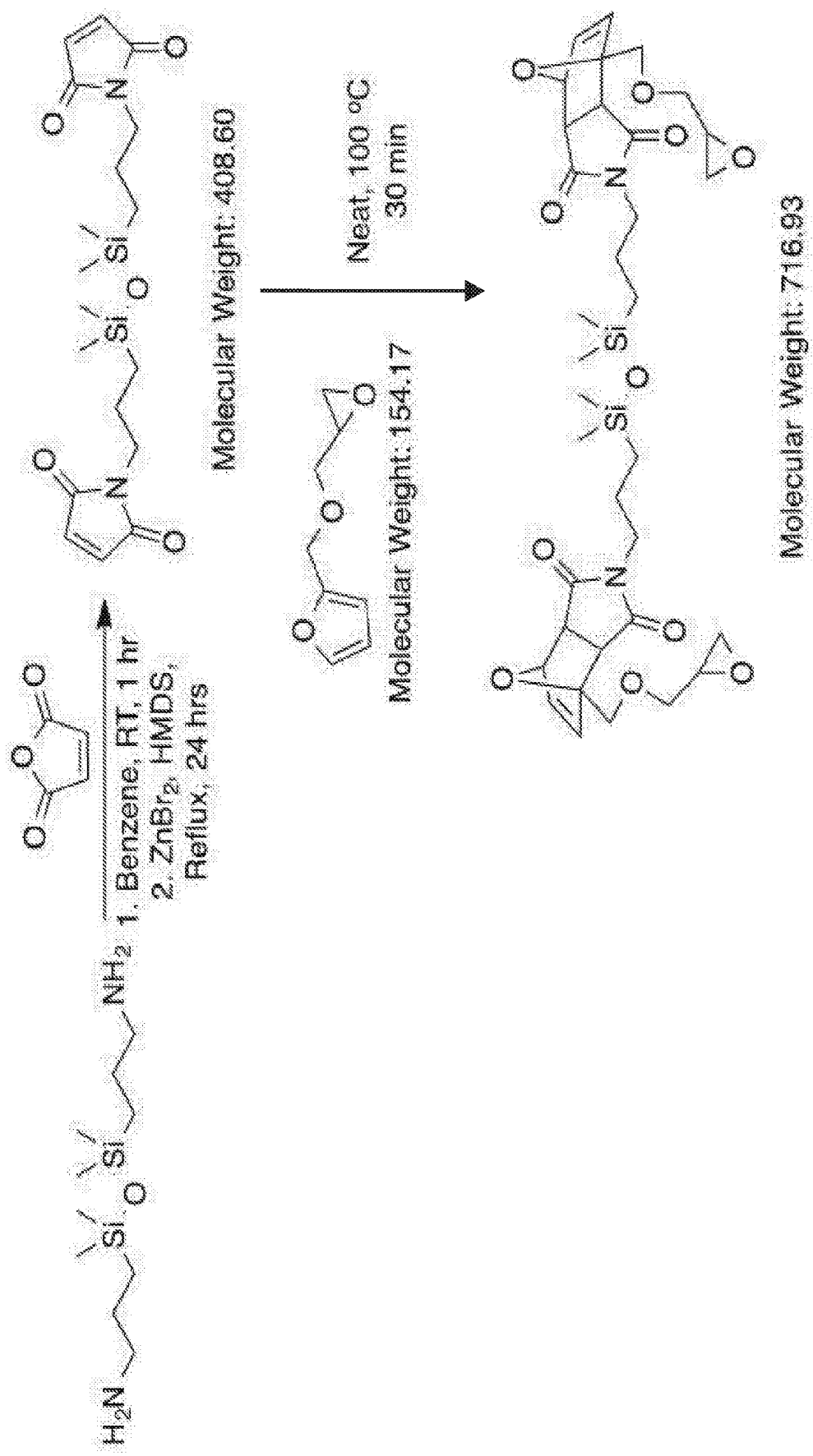
FIG. 1 shows a general reaction scheme of forming a thermally reworkable epoxy resin.
Figure 2:
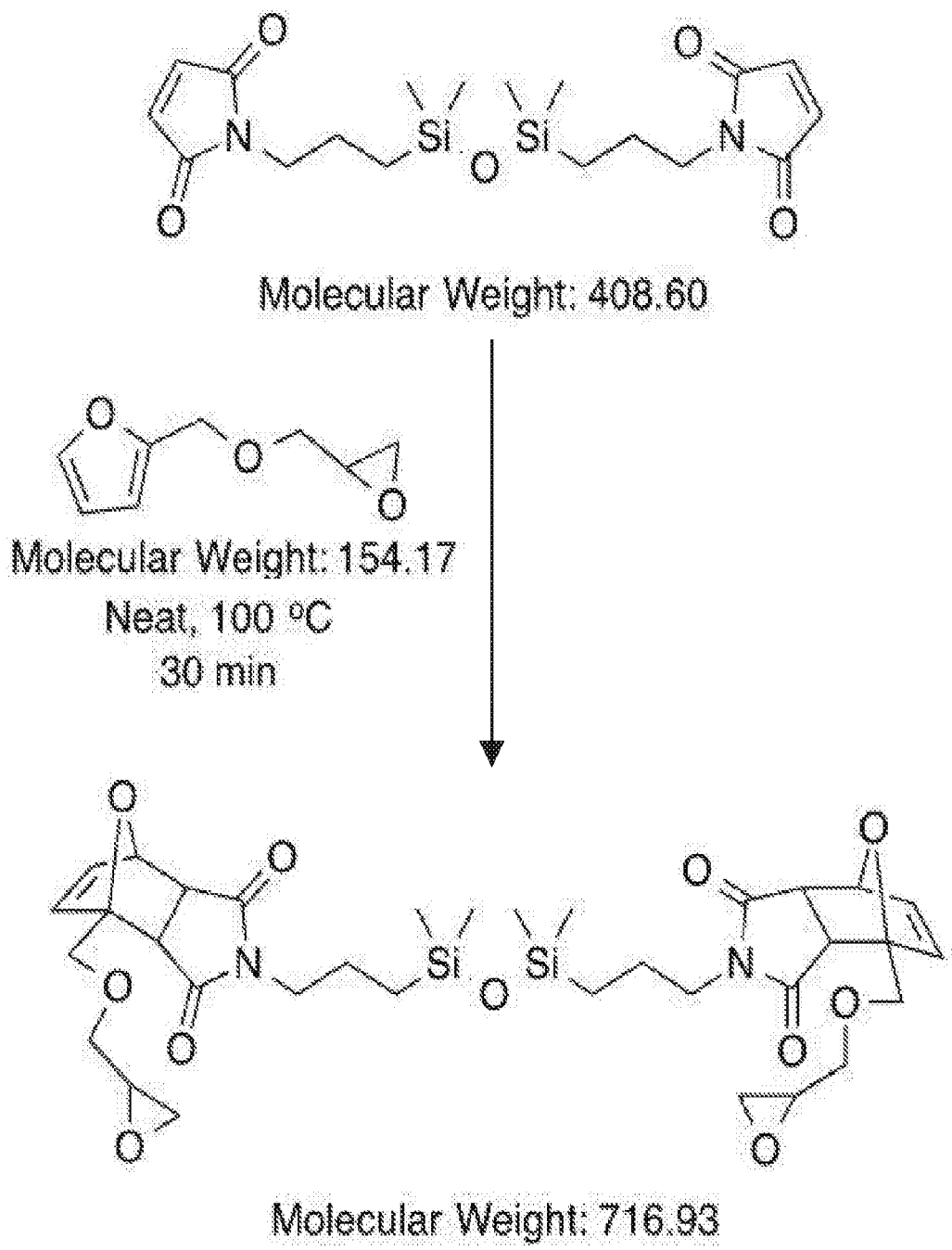
FIG. 2 shows the formation of epoxy resin by the reaction of 1,3-bis(3-maleimideopropyl)tetramethyldisiloxane with furfuryl glycidyl ether.
Figure 3:
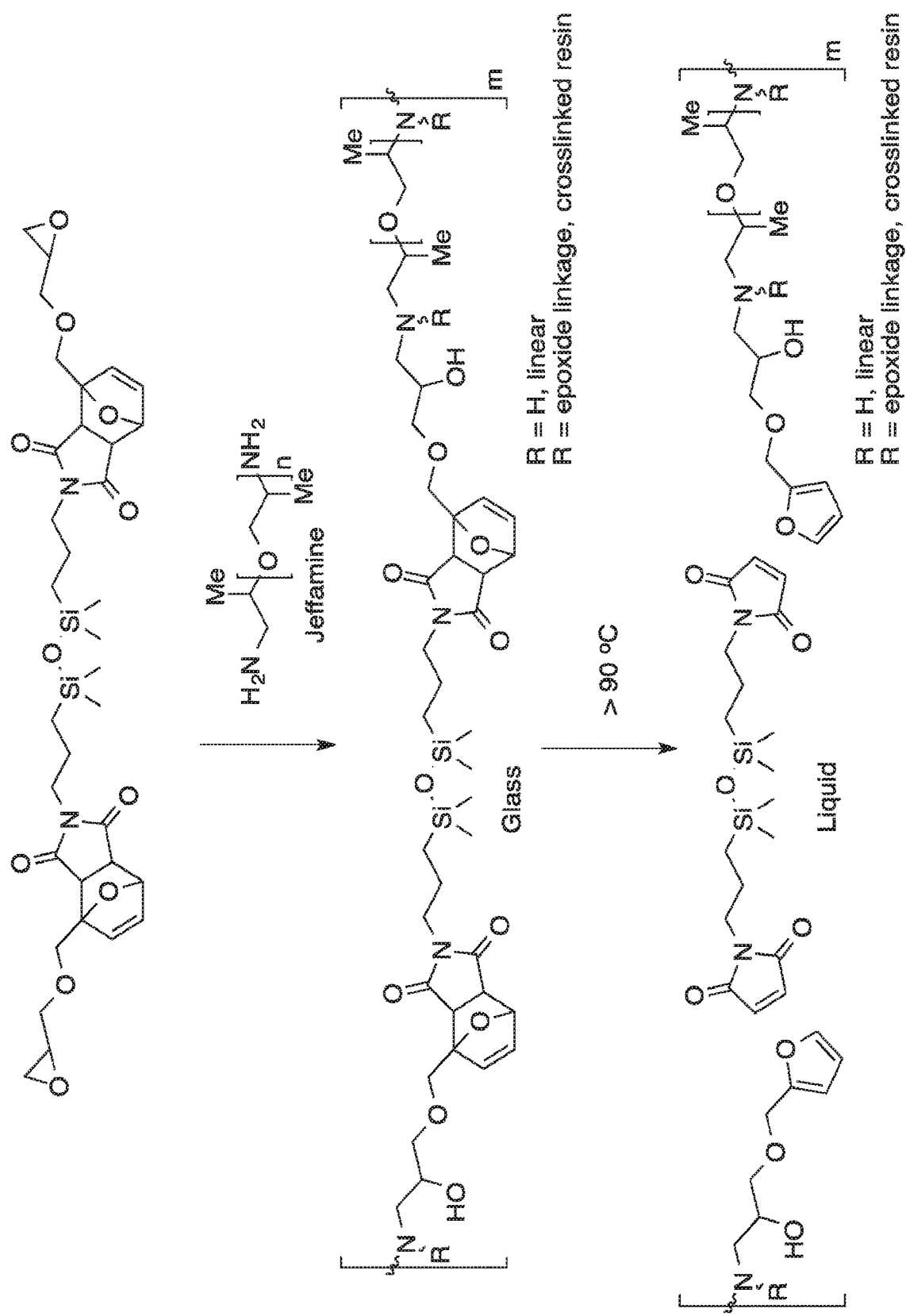
FIG. 3 shows the formation of a robust network of epoxy resin after reacting the first product with Jeffamine and also a retro Diels-Aider reaction to get back the original maleimide after heating the final robust network of epoxy above 90° C.
Figure 4:
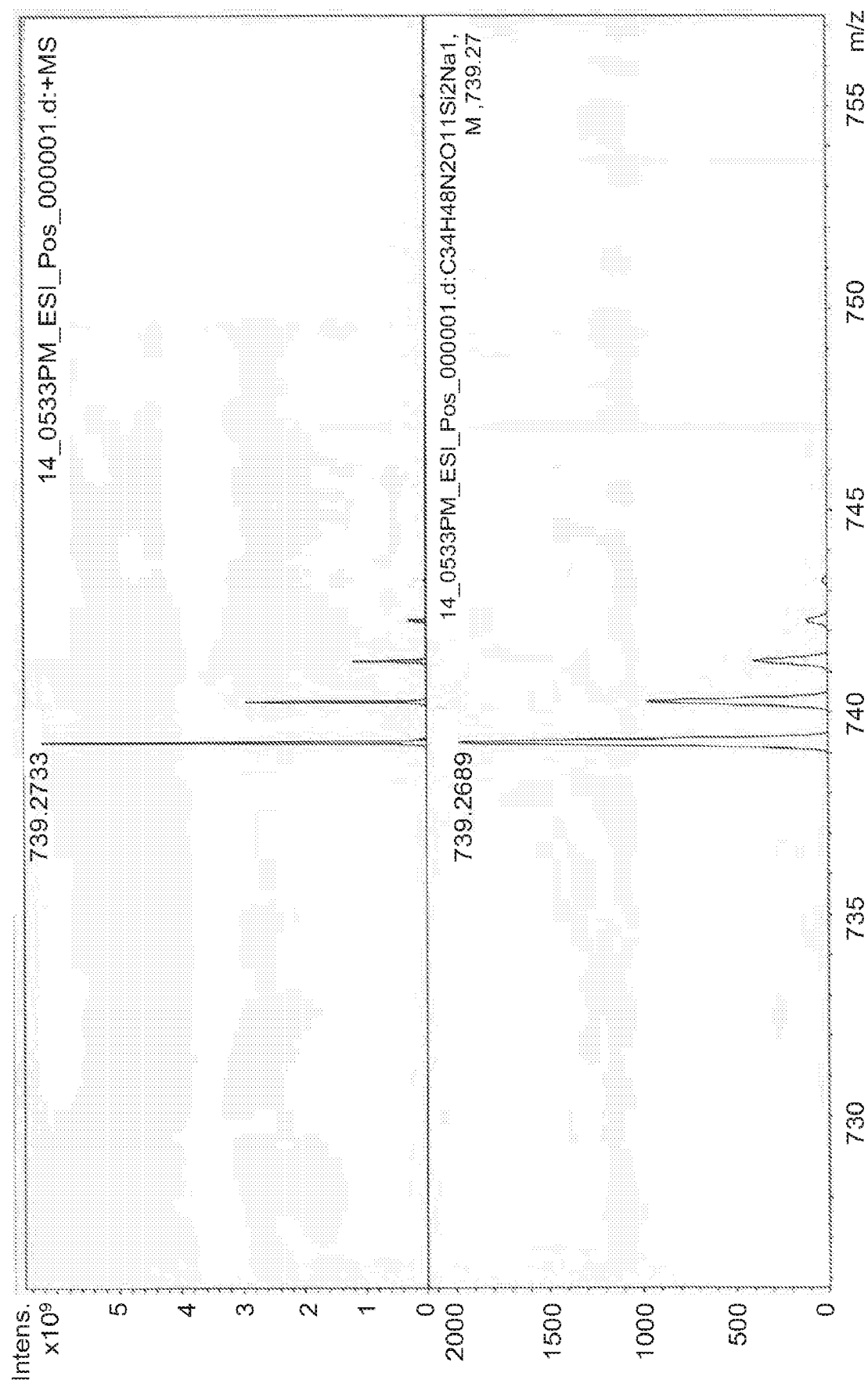
FIG. 4 shows examples of mass spectroscopy of siloxane-linked epoxy, the first spectroscopy is observed and the second spectroscopy is theoretical.

Referring to FIGS. 1-5, the present invention features a method of making a thermally reworkable epoxy material. In some embodiments, the method comprises forming a first product by reacting a maleimide component with an electron donating component. The first product was further cured with an amine component to form the thermally reworkable robust network of the epoxy material.

In some embodiments, the maleimide component comprises:

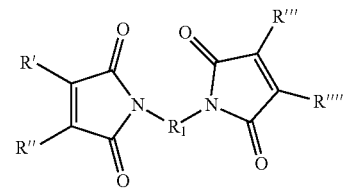

wherein: $R_1$=diphenylmethyl, bismethylenephenyl, tetremethyl (bis-propyl)-disiloxane, alkane, ether, amide or carbamate;
R'=hydrogen or methyl.
R"=hydrogen or methyl,
R'"=hydrogen or methyl, and
R""=hydrogen or methyl.

In preferred embodiments, R', R", R'", R"" can be the same or any combination of groups from the above. In some embodiments, the alkanes of $R_1$ may comprise hydrocarbon components. Examples of the hydrocarbon components include, but are not limited to $-C_2H_4$, $-C_3H_6$ or $-C_4H_8$ units. In some embodiments, the ethers of $R_1$ may comprise alkyl ethers. Examples of the alkyl ether components include, but are not limited to an ethylene glycol dimethyl ether, a propelyne glycol dimethyl ether or a diethylene glycol dimethyl ether. In other embodiments, examples of the amide components of $R_1$ include, but are not limited to, a carboxamide, a phosphoramide or a sulfonamide.

According to some embodiments, the electron donating component comprises a furan ring. In one embodiment, the furan component can have the structure:

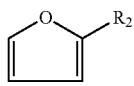

In some embodiments, $R_2$ can be epoxy ether. For example, $R_2$ may comprise the structure:

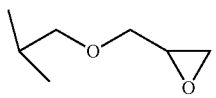

wherein an epoxide end of $R_2$ functions as an electron receiving group.

In some embodiments, the first product may comprise the structure:

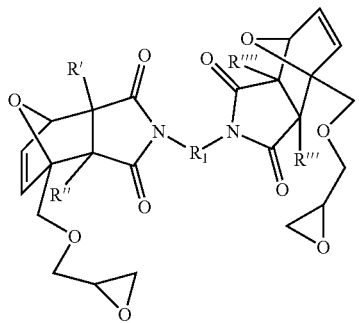

wherein: $R_1$=diphenylmethyl, tetramethyl (bis-propyl-disiloxane, alkane, ether, amide or carbamate,
R'=hydrogen or methyl,
R"=hydrogen or methyl,
R'"=hydrogen or methyl, and
R""=hydrogen or methyl.
In other embodiments, R', R", R'", R"" can be the same or any combination of groups from the above.

According to some embodiments, the amine component may comprise a diamine having one or more of the following structures:

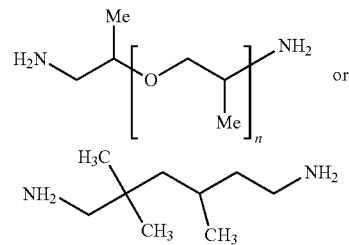

wherein: n=1-50, 10-50, 20-30, 20-50; 35-50 or 40-50.

In some embodiments, the diamine component functions as a curing agent. In other embodiments, the diamine component may comprise a polymeric unit of alkane ether with a chain length denoted by 'n'. For example, in some embodiments, n=1-50. In other embodiments, n can range from about 10-50, or about 20-30, or about 20-50, or about 35-50, or about 40-50.

According to some embodiments, the first product is formed at a temperature range of about 90° C. to 110° C. In other embodiments, the first product is formed at a temperature range of about 95° C. to 110° C. In still other embodiments, the first product is formed at a temperature range of about 100° C. to 110° C. In further embodiments, the first product is formed at a temperature range of about 95° C. to 100° C. In a preferred embodiment, the first product is formed a temperature of about 100° C.

In some preferred embodiments, the first product is formed within a range of minutes after mixing of the maleimide component and the electron donating component. For instance, in some embodiments, the first product is formed between about 20 minutes to 40 minutes after mixing of the maleimide component and the electron donating component. In some embodiments, the first product is formed between about 25 minutes to 40 minutes after mixing of the maleimide component and the electron donating component. In some embodiments, the first product is formed between about 30 minutes to 40 minutes after mixing of the maleimide component and the electron donating component. In a preferred embodiment, the first product is formed within about 30 minutes after mixing of the maleimide component and the electron donating component.

In some preferred embodiments, the first product may be a colorless liquid and the first product may be formed without the presence of a solvent.

In some preferred embodiments, the first product is formed with a range of yields after mixing of the maleimide component and the electron donating component. For example, in some embodiments, first product is formed with a yield of about 90% to 99%. In some embodiments, first product is formed with a yield of about 92% to 99%. In some embodiments, first product is formed with a yield of about 95% to 99%. In some other embodiments, the first product is formed with a yield of about 95%.

According to some embodiments, the first product is cured with the amine at a range of temperatures. In some embodiments, the first product is cured at a temperature range of about 20° C. to 25° C. In other embodiments, the first product is cured at a temperature range of about 22° C. to 25° C. In further embodiments, the first product is cured at a temperature range of about 23° C. to 25° C.

In some embodiments, the maleimide component and the electron donating component are present in a ratio of about 1:2.

According to some embodiments, the reaction is performed under an inert gas atmosphere. For example, the inert gas may be Argon. However, any suitable inert gas may be used when practicing the invention.

In some embodiments, the present invention features a method of making a thermally reworkable epoxy resin by mixing two equivalents of an electron donating group containing furan component with one equivalent of bis-maleimide. The mixture of the maleimide component and the furan component was heated to produce a liquid as the first product with a molecular weight of about 716.93. In some preferred embodiments, the first product was cured with a diamine hardener to form the thermally reworkable epoxy material.

According to some embodiments, the present invention features a method of making a thermally reworkable epoxy material by forming a first product by reacting a maleimide component with an electron donating component,
wherein the maleimide component comprises:

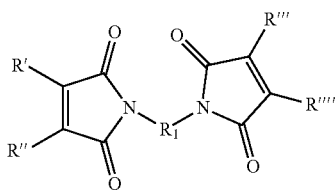

wherein: $R_1$=diphenylmethyl, tetramethyl (bis-propyl)-disiloxane, alkane, ether, amide or carbamate;
R'=hydrogen or methyl,
R"=hydrogen or methyl,
R'"=hydrogen or methyl, and
R""=hydrogen or methyl.

In some embodiments, the electron donating component comprises a furan component having the structure:

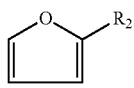

wherein $R_2$ can be an epoxy ether. In one embodiment. $R_2$ can have an epoxide end that functions as an electron receiving group. For example, $R_2$ may comprise the structure:

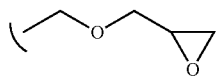

In some embodiments, the first product is further cured with an amine component to form the thermally reworkable epoxy material. According to some embodiments, the amine component comprises a diamine component having one or more of the following structure:

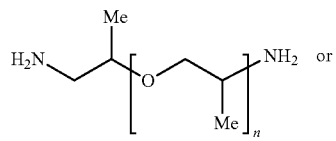

-continued

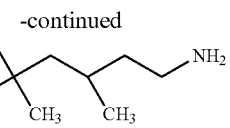

wherein: n=1-50, 10-50, 20-30, 20-50; 35-50 or 40-50.

In other embodiments, the diamine component may comprise a polymeric unit of alkane ether with a chain length denoted by 'n'. For instance, in some embodiments, n=1-50. For example, in some embodiments, n=1-50. In other embodiments, n can range from about 10-50, or about 20-30, or about 20-50, or about 35-50, or about 40-50. In still other embodiments, the diamine component functions as a curing agent or a hardener. In further embodiments, the first product and the diamine component are present in a ratio of about 2:1.

According to some embodiments, the thermally reworkable epoxy material may be a thermoset or an adhesive.

In some embodiments, the adhesive shows an E-modulus of about 205.213 MPa at a concentration of 0.0294 (g) of the thermally reworkable epoxy material after curing for about 5 days at a temperature ranging from about 20° C. to 30° C. In some embodiments, the adhesive shows an E-modulus of about 224.475 MPa at a concentration of 0.029 (g) of the thermally reworkable epoxy material after curing for about 5 days at a temperature ranging from about 20° C. to 30° C. In some embodiments, the adhesive shows an E-modulus of about 231.717 MPa at a concentration of 0.029 (g) of the thermally reworkable epoxy material after curing for about 5 days at a temperature ranging from about 20° C. to 30° C. In some embodiments, the adhesive shows an E-modulus of about 224.475 MPa at a concentration of 0.029 (g) of the thermally reworkable epoxy material after curing for about 5 days at a temperature ranging from about 20° C. to 30° C. In some embodiments, the adhesive shows an E-modulus of about 202.853 MPa at a concentration of 0.030 (g) of the thermally reworkable epoxy material after curing for about 5 days at a temperature ranging from about 20° C. to 30° C. In some embodiments, the adhesive shows an E-modulus of about 189.573 MPa at a concentration of 0.030 (g) of the thermally reworkable epoxy material after curing for about 5 days at a temperature ranging from about 20° C. to 30° C. In some embodiments, the adhesive shows an E-modulus of about 177.45 MPa at a concentration of 0.029 (g) of the thermally reworkable epoxy material after curing for about 5 days at a temperature ranging from about 20° C. to 30° C.

As used herein, the term "E-modulus" describes as the tensile elasticity, or the tendency of an object to deform along an axis when opposing forces are applied along that axis. It is defined as the ratio of tensile stress to tensile strain. It is often referred to simply as the elastic modulus.

In some embodiments, the adhesive shows an E-modulus of about 174.36 MPa at a concentration of 0.029 (g) of the thermally reworkable epoxy material after curing at a temperature of about 100° C. after reclamping in an oven. In some embodiments, the adhesive shows an E-modulus of about 221.400 MPa at a concentration of 0.030 (g) of the thermally reworkable epoxy material after curing at a temperature of about 100° C. after reclamping in an oven. In some embodiments, the adhesive shows an E-modulus of about 203.078 MPa at a concentration of 0.030 (g) of the thermally reworkable epoxy material after curing at a temperature of about 100° C. after reclamping in an oven. In some embodiments, the adhesive shows an E-modulus of about 163.274 MPa at a concentration of 0.029 (g) of the thermally reworkable epoxy material after curing at a temperature of about 100° C. after reclamping in an oven. In some embodiments, the adhesive shows an E-modulus of about 241.118 MPa at a concentration of 0.029 (g) of the thermally reworkable epoxy material after curing at a temperature of about 100° C. after reclamping in an oven. In some embodiments, the adhesive shows an E-modulus of about 200.646 MPa at a concentration of 0.0294 (g) of the thermally reworkable epoxy material after curing at a temperature of about 100° C. after reclamping in an oven.

In some embodiments, the adhesive shows an E-modulus of about 245.135 MPa at a concentration of 0.029 (g) of the thermally reworkable epoxy material after curing at a temperature of about 110° C. after reclamping in an oven. In some embodiments, the adhesive shows an E-modulus of about 270.569 MPa at a concentration of 0.030 (g) of the thermally reworkable epoxy material after curing at a temperature of about 110° C. after reclamping in an oven. In some embodiments, the adhesive shows an E-modulus of about 221.295 MPa at a concentration of 0.030 (g) of the thermally reworkable epoxy material after curing at a temperature of about 110° C. after reclamping in an oven. In some embodiments, the adhesive shows an E-modulus of about 263.903 MPa at a concentration of 0.029 (g) of the thermally reworkable epoxy material after curing at a temperature of about 110° C. after reclamping in an oven. In some embodiments, the adhesive shows an E-modulus of about 256.774 MPa at a concentration of 0.029 (g) of the thermally reworkable epoxy material after curing at a temperature of about 110° C. after reclamping in an oven. In some embodiments, the adhesive shows an E-modulus of about 251.535 MPa at a concentration of 0.0294 (g) of the thermally reworkable epoxy material after curing at a temperature of about 110° C. after reclamping in an oven.

According to some embodiments, the first product is cured with the diamine component at a temperature ranging from about 20° C. to 30° C. to form the thermally reworkable epoxy material. In other embodiments, the first product is cured with the diamine component at a temperature ranging from about 25° C. to 30° C. In still other embodiments, the first product is cured with the diamine component at about 25° C.

In some embodiments, the first product is cured with the diamine component at a temperature range of about 40° C. to 50° C. to form the thermally reworkable epoxy material. In other embodiments, the first product is cured with the diamine component at a temperature range of about 45° C. to 50° C. In some preferred embodiments, the first product is cured with the diamine component at about 50° C. to form the thermally reworkable epoxy material.

In some preferred embodiments, the thermally reworkable epoxy material was heated to produce the original maleimide component and the electron donating component through a retro Diels-Alder reaction. In some embodiments, the retro Diels-Alder reaction was performed at a temperature range of about 90° C to 115° C. In some embodiments, the retro Diels-Alder reaction was performed at a temperature range of about 95° C. to 115° C. In some embodiments, the retro Diels-Alder reaction was performed at a temperature range of about 100° C. to 115° C. In some embodiments, the retro Diels-Alder reaction was performed at a temperature range of about 110° C. to 115° C. In some preferred embodiments, the retro Diels-Alder reaction was performed at a temperature of about 110° C.

The present invention provides a composition of a thermally reworkable epoxy material comprising a maleimide component, an electron donating component comprising a furan component, and a curing agent. A first product was formed by the reaction of the maleimide component and the electron donating furan component. Whereupon curing of the first product, the first product bonds with the curing agent to form the thermally reworkable epoxy material.

The present invention features a composition of a robust network of epoxy material. As an example, the composition comprises:

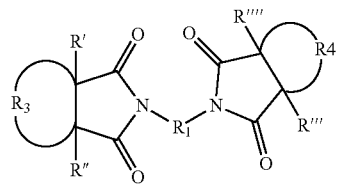

wherein: $R_1$=diphenylmethyl, tetramethyl (bis-propyl)-disiloxane, alkane, ether, amide or carbamate;
  $R'$=hydrogen or methyl,
  $R''$=hydrogen or methyl,
  $R'''$=hydrogen or methyl,
  $R''''$=hydrogen or methyl.
  $R_3$=a cyclic structure; and
  $R_4$=a cyclic structure.

Any cyclic structure may be used in accordance with the present invention. Examples of the cyclic structures include, but are not limited to a cyclopentadiene or other dienes. Some non-limiting examples of the cyclic structures are as follows:

The present invention also features a composition of a robust network of epoxy material. In some embodiments, the composition comprises the structure:

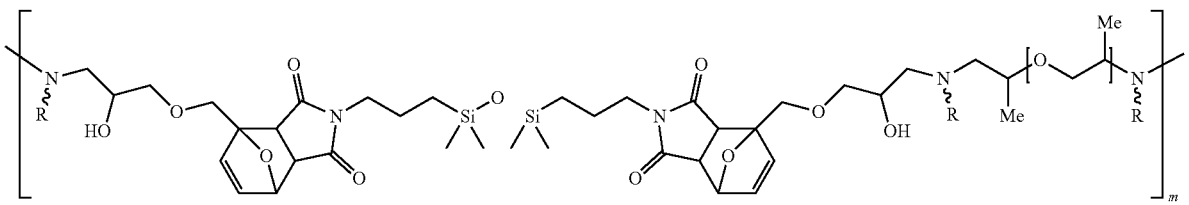

wherein: R=hydrogen, m≥1.

According to another embodiment, the present invention features a method of making a robust network of a thermally reworkable epoxy material. The method may comprise reacting a maleimide component and an electron donating component having a furan ring to form a first product. The first product may be further cured with a curing agent, thereby forming the robust network of the thermally reworkable epoxy material having the following structure:

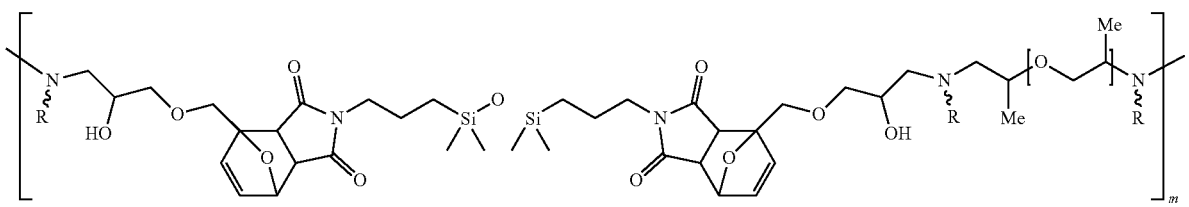

wherein: R=hydrogen, m≥1.

In some embodiments, the first product comprises the following structure:

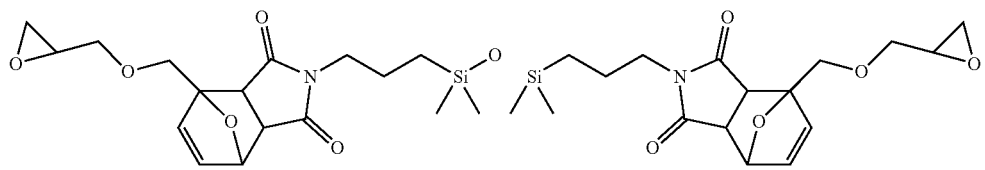

In some embodiments, the maleimide component comprises the following structure

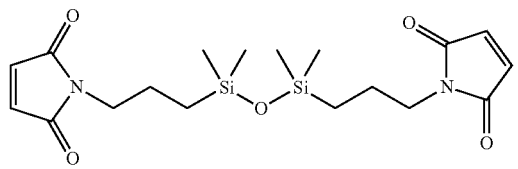 [SMILES: C[Si](C)(CCCN1C(=O)C=CC1=O)O[Si](C)(C)CCCN1C(=O)C=CC1=O]

In some embodiments, the electron donating furan component comprises the following structure:

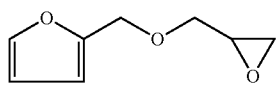 [SMILES: c1coc(COCC2CO2)c1]

In some embodiments, the curing agent comprises the following structure:

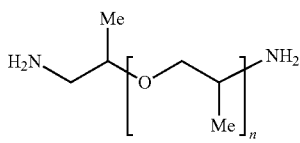

wherein: n=1-50, 10-50, 20-30, 20-50; 35-50 or 40-50.

In other embodiments, the curing agent may comprise a polymeric unit of alkane ether with a chain length denoted by 'n'. For instance, in some embodiments, n=1-50. In some embodiments, n=10-50. In some embodiments, n=20-30. In some embodiments, n=20-50. In some embodiments, n=35-50. In some embodiments, n=40-50.

As shown in FIG. 5, the strength of the robust network of epoxy material has been assessed by adhesive lap shear testing with aluminum coupons. Desirable characteristics of this material include its colorlessness and the fact that the uncured epoxy is a liquid that can be cured with a hardening reagent without the application of heat.

EXAMPLES

The following are exemplary synthetic procedures, and are included here as non-limiting examples only.

Reaction of
1,3-bis(3-maleimideopropyl)tetramethyldisiloxane
with furfuryl glycidyl ether 1,3-bis(3-maleimideopropyl)tetramethyldisiloxane was prepared according to established procedure. High yield (95%) was obtained by running reaction under argon and reacting on heat for ~3 days. Furfuryl glycidyl ether was distilled to remove colored impurity. Transfer of the pure ether took place at 0.380 Torr and 50° C. The freshly distilled ether (0.377 g, 0.336 mL, 2.45 mmol) was reacted with the bis-maleimide (500 mg, 1.22 mmol). The reaction was heated to 100° C. for 30 min and slowly cooled to RT. The liquid product obtained had an orange tint. The crude mass of the product (0.873 g, 1.22 mmol) showed that negligible mass was lost during the Diels-Alder reaction. Dissolving the compound in DCM and passing the solution through activated carbon reduced the color from orange to a very pale yellow. The resulting liquid still showed two spots on TLC but separation and identification using a silica column has not yet been perfected. It has been found that a TEOS doped column appears to give better separation but after the column purified sample was dried in the vacuum oven, multiple spots were seen by TLC. It is unclear whether this is due to poor chromatography, thermal degradation in the oven or contamination in the oven.

Mass spec verifies the structure of the expected product (+Na) and MS/MS of the product peak gives two fragments with losses of 154 and 308 amu. These mass losses correspond to loss of furfuryl glycidyl ether through retro Diels Alder reaction. NMR has been run but is difficult to interpret. This may be due to the mixture of exo and endo products.

The newly formed bis-epoxide was reacted with part B of Epo-Tek 301 resin which consists of 2,2,4-trimethyl-1,6- hexanediamine. As calculated assuming perfect stoichiometry, 50 mg (0.07 mmol) of the bis epoxide was mixed with 5 mg (0.03 mmol) of hardener and clamped between two glass microscope slides. The assembly was cured in a 50° C. oven.

As used herein, the term "about" refers to plus or minus 10% of the referenced number.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. Reference numbers recited in the claims are exemplary and for ease of review by the patent office only, and are not limiting in any way. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting of", and as such the written description requirement for claiming one or more embodiments of the present invention using the phrase "consisting of" is met.

What is claimed is:

1. A method of making a thermally reworkable epoxy material, the method comprising:
   a) forming a first product by reacting a maleimide component with an electron donating component, wherein the maleimide component comprises:

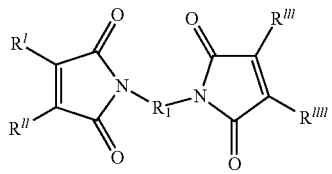

wherein: $R_1$=tetramethyl (bis-propyl)-disiloxane, or carbamate;
   R'=hydrogen or methyl,
   R"=hydrogen or methyl,
   R'''=hydrogen or methyl, and
   R''''=hydrogen or methyl, and
   b) curing the first product with an amine component to form a final product, wherein the final product is a thermally reworkable epoxy material.

2. A method of making a thermally reworkable epoxy material, the method comprising:
   a) forming a first product by reacting a maleimide component with an electron donating component, wherein the maleimide component comprises:

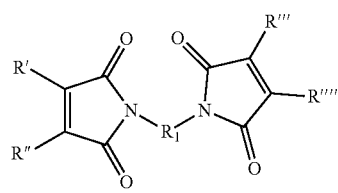

wherein: $R_1$=tetramethyl (bis-propyl)-disiloxane,
   R'=hydrogen or methyl,
   R"=hydrogen or methyl,
   R'''=hydrogen or methyl, and
   R''''=hydrogen or methyl, and
   b) curing the first product with an amine component to form a final product, wherein the final product is a thermally reworkable epoxy material.

3. The method of claim 2, wherein the electron donating component comprises a furan component.

4. The method of claim 2, wherein the electron donating component comprises a furan component having the structure:

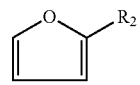

wherein $R_2$ is an epoxy ether.

5. The method of claim 4, wherein $R_2$ of the furan component comprises the structure:

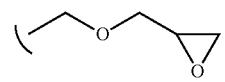

wherein an epoxide end of $R_2$ functions as an electron receiving group.

6. The method of claim 2, wherein the first product comprises the structure:

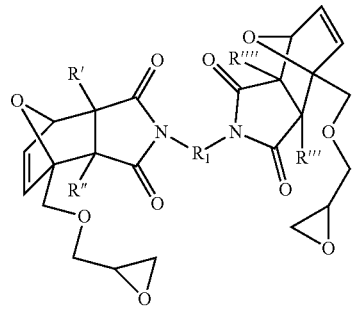

wherein: $R_1$=tetramethyl (bis-propyl)-disiloxane,
R'=hydrogen or methyl,
R"=hydrogen or methyl,
R'''=hydrogen or methyl, and
R''''=hydrogen or methyl.

7. The method of claim 2, wherein the amine component comprises a diamine having one or more of the following structures:

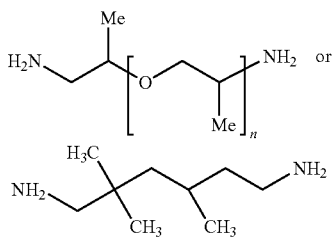

wherein: n=1-50, 10-50, 20-30, 20-50; 35-50 or 40-50.

8. The method of claim 7, wherein the diamine component functions as a curing agent.

9. The method of claim 2, wherein the first product is formed at a temperature range of about 90° C. to 110° C.

10. The method of claim 2, wherein the first product is formed between about 20 minutes to 40 minutes after mixing of the maleimide component and the electron donating component, wherein the maleimide component reacts with the electron donating component to form the first product.

11. The method of claim 2, Wherein the first product is formed without the presence of a solvent.

12. The method of claim 2, wherein the first product formed is a colorless liquid.

13. The method of claim 2, wherein first product formed with a range of yield of about 90% to 99%.

14. The method of claim 2, wherein the first product is care with the amine at a temperature range of about 20° C. to 25° C.

15. The method of claim 2, wherein the thermally reworkable epoxy material is an adhesive.

16. The method of claim 15, wherein the adhesive has an E-modulus of about 205.213 MPa at a concentration of 0.0294 (g) of the thermally reworkable epoxy material after curing for about 5 days at a temperature range of about 20° C. to 30° C.

17. The method of claim 15, wherein the adhesive has an E-modulus of about 200.646 M Pa at a concentration of 0.0294 (g) of the thermally reworkable epoxy material after curing at a temperature of about 100° C. after reclamping in an oven.

18. The method of claim 15, wherein the adhesive has an E-modulus of about 251.535 at a concentration of 0.0294 (g) of the thermally reworkable epoxy material after curing at a temperature of about 110° C. after reclamping in an oven.

19. The method of claim 2, wherein the thermally reworkable epoxy material was heated to produce the original maleimide component and the electron donating component through a retro Diels-Alder reaction.

20. The method of claim 19, wherein the retro Diels-Alder reaction was performed at a temperature range of about 90° C. to 115° C.

* * * * *